United States Patent
Ito

(10) Patent No.: US 6,650,846 B1
(45) Date of Patent: Nov. 18, 2003

(54) OPTICAL TRANSMITTER AND OPTICAL TRANSMISSION SYSTEM

(75) Inventor: Toshiharu Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/324,484

(22) Filed: Jun. 2, 1999

(30) Foreign Application Priority Data

Jun. 9, 1998 (JP) .......................................... 10-160723

(51) Int. Cl.$^7$ ............................................ H04B 10/04
(52) U.S. Cl. ...................................... 398/184; 398/188
(58) Field of Search ................................ 359/180, 181; 398/152, 184, 188

(56) References Cited

U.S. PATENT DOCUMENTS

| | | | | |
|---|---|---|---|---|
| 5,872,647 A | * | 2/1999 | Taga et al. ................ | 359/156 |
| 5,920,413 A | * | 7/1999 | Miyakawa et al. ......... | 359/122 |
| 5,946,119 A | * | 8/1999 | Bergano et al. ............ | 359/124 |
| 6,023,362 A | * | 2/2000 | Walker et al. .............. | 359/156 |

FOREIGN PATENT DOCUMENTS

| | | |
|---|---|---|
| JP | 8-111662 | 4/1996 |
| JP | 9-186655 | 7/1997 |
| JP | 10-41894 | 2/1998 |
| JP | 11-234213 | 8/1999 |

OTHER PUBLICATIONS

"Bit–synchronous polarization and phase modulation improves the performance of optical amplifier transmission systems", by Neal S. Bergano, et al., Optical Fiber Communication Conference '96, TuN1, 1996.

Long–Haul WDM Trnasmission Uisng Optimum Channel Modulation: A 160 Gb/s (32x5Gb/s) 9,300 km Demonstration, by Neal S. Bergano, et al., Optical Fiber Communication Conference '97, PD16, 1997.

"32 Channel 5.3 Gbit/s transmission experiment over 9879km using broadband EDFAs", by N. Shimojoh, et al., Electronics Letters, vol. 33, No. 10, pp. 877–879, 1997.

"170 Gb/s Transmission Over 10,850 km Using Large Core Transmission Fiber", by M. Suzuki, et al., Optical Fiber Communication Conference '98 , PD17, 1998.

* cited by examiner

Primary Examiner—Jason Chan
Assistant Examiner—Shi K. Li
(74) Attorney, Agent, or Firm—Scully, Scott, Murphy & Presser

(57) ABSTRACT

An optical transmitter configurating an optical transmission system according to this invention comprises a light source, an intensity modulator for modulating the intensity of light output from the light source according to NRZ data that is transmission data, and a polarization modulator for modulating the polarization of an output from the intensity modulator according to an alternating signal. Instead of the NRZ data, an RZ signal maybe used for modulation, and instead of the alternating signal, a signal may be used that inverts a logic for those bits having a value for the larger intensity of the modulated light. A phase modulator using a bit rate frequency sine wave as a modulation input may be inserted between the intensity modulator and the polarization modulator. In this case, the intensity and phase modulators may be connected in the reverse order. In addition, at least one optical amplifier may be inserted between any adjacent modulators.

29 Claims, 12 Drawing Sheets

OPTICAL TRANSMITTER AND OPTICAL TRANSMISSION SYSTEM

BACKGROUND OF THE INVENTION

1. Field of the Invention

The present invention relates to an optical transmitter and an optical transmission system, and in particular, to an optical transmitter and an optical transmission system that can improve transmission characteristics by suppressing non-linear effects occurring in an optical fiber transmission line.

2. Description of Related Art

In the field of optical communication, optical signals are conventionally transmitted via repeaters including 3R functions (retiming, reshaping, and regenerating). Such a repeater converts a transmitted optical signal into an electric signal, which is then subjected to predetermined processing and converted into the optical signal again before transmission to an optical transmission line. Recently developed optical fiber amplifiers, however, have enabled signals to be transmitted over a long distance of several thousands of km's using only repeaters without the 3R functions. Consequently, the reliability of the optical transmission system has been improved and costs have been reduced. On the other hand, to further increase the transmission capacity, active efforts are being made to research a wavelength-division multiplexed (WDM) optical transmission system that transmits optical signals having mutually different wavelengths using a single transmission line. The wavelength-division multiplexed optical transmission has already realized a transmission capacity of larger than 1 Tb/s over a transmission distance of several hundred km. Such improved transmission distance and capacity have mostly been achieved by the ability of the optical fiber amplifier to amplify signal lights through a plurality of channels at a time.

Research is being widely conducted to implement long-distance and large-capacity optical transmissions using the optical fiber amplifier and WDM technology. The demand for the transmission capacity is expected to explosively increase due to the international spread of Internet. In particular, the demand for transmissions between Japan and the U.S. is predicted to increase, so the energetic research of very-long-distance (~10,000 km) systems across the Pacific Ocean is under way.

In order to realize long-distance transmissions, the waveform must be prevented from being degraded due to various factors. For example, the waveform may be degraded due to the polarization dependent effect occurring in the transmission line. The polarization dependent effect refers to the dependency of the transmission characteristics of optical fibers on the polarization state of signal light, and includes polarization dependent loss.

Various techniques have been developed to suppress the polarization dependent effect occurring in the optical fiber transmission line. For example, to suppress the polarization dependent effect occurring in the transmission line, bit-synchronized polarization scramble can be applied to signal light output from an optical transmitter. The bit-synchronized polarization scrambling can be applied for signal light in order to eliminate polarization effect of the transmission line. This technique smoothes the polarization dependent effect for each bit to prevent the transmission characteristics from varying depending on the polarization state of signal light.

There are, however, various other factors causing the waveform to be degraded during propagation through optical fibers, and appropriate measures are required for these factors.

SUMMARY OF THE INVENTION

It is an object of this invention to provide an optical transmitter and an optical transmission system that can sufficiently suppress waveform degradation caused by an SPM-GVD effect.

To achieve this object, an optical transmitter according to the present invention comprises an optical modulator for modulating the intensity of input light based on transmission data to output modulated light and a polarization modulator for modulating the polarization of the modulated light based on a polarization modulating signal, wherein each bit of the polarization modulating signal is set to have the same time interval as each bit of the transmission data.

Furthermore, the polarization modulator sets the polarization of each bit of the modulated light to one of two orthogonal polarizations for output, according to the polarization modulating signal.

The optical modulator may comprise an intensity modulator for modulating the intensity of input light based on the transmission data to output intensity-modulated light and a phase modulator for modulating the phase of the intensity-modulated light based on a bit rate frequency sine wave that is a sine wave of a frequency corresponding to the bit rate of the transmission data.

The optical modulator may comprise a phase modulator for modulating the phase of the intensity-modulated light based on a bit rate frequency sine wave that is a sine wave of a frequency corresponding to the bit rate of the transmission data to output phase-modulated light and an intensity modulator for modulating the intensity of the phase-modulated light based on the transmission data.

BRIEF DESCRIPTION OF THE DRAWINGS

The above and other objects, features, and advantages of the present invention will become more apparent from the following detailed description when taken in conjunction with the accompanying drawings wherein.

DETAILED DESCRIPTION OF THE PREFERRED EMBODIMENTS

Figure 1:
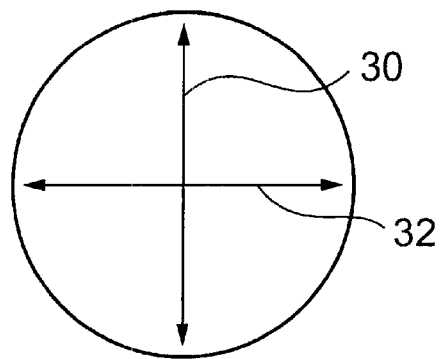
FIG. 1 is a conceptual drawing showing a cross section of an optical fiber to describe the effect of polarization dependency.

Prior to the description of the present invention, the conventional techniques are explained to make it understood easily.

As described above, appropriate measures are required for various factors causing transmission degradation in order to implement long-distance optical fiber transmissions. The required measures are, for example, improvement of the characteristics of a repeater optical amplifier (reduction of the noise figure, expansion of the amplification bandwidth, and flattening of the gain), appropriate dispersion allocation of transmission lines, development of dispersion compensation methods, and establishment of methods for suppressing various non-linear optical effects occurring in the transmission line.

Of the non-linear optical effects, the degradation of the waveform caused by an SPM-GVD effect that is an interaction between self phase modulation (SPM) and group velocity dispersion (GVD) is the greatest factor inhibiting the improvement of the transmission capacity.

First, the self phase modulation (SPM) will be described.

The propagation speed of light in optical fibers depends on the refractive index of glass acting as a transmission medium. The refractive index of the optical fiber is very small but varies with the instantaneous intensity of transmitting signal light. The self phase modulation in optical fibers refers to phase modulation applied to signal light due to variations in refractive index caused by the instantaneous intensity of signal light. This effect causes signal light of a varying intensity to have its phase vary with the intensity. The SPM, however, does not vary signal waveforms, so it varies signal light spectra but not signal light waveforms.

Next, the group velocity dispersion (GVD) effect in wavelength-division multiplexed transmissions will be described.

The transmission velocity of optical signals through optical fibers generally depends on their wavelength. A wavelength region in which light of a shorter wavelength travels at a larger velocity is called a "normal dispersion" region (a negative dispersion region), while a wavelength region in which light of a longer wavelength travels at a larger velocity is called an "anomalous dispersion" region (a positive dispersion region). In addition, the dispersion slope of optical fibers (the dependency of group velocity dispersion on the wavelength) has an inclination in the same direction despite the group velocity dispersion (some fibers exceptionally have the opposite inclination), and the value of group velocity dispersion decreases with decreasing wavelength.

In long-distance wavelength-division multiplexed optical transmission system, most transmission lines are composed of normal-dispersion fibers (fibers having negative dispersions around the signal wavelength band). To compensate for negative dispersions accumulated in the transmission line, dispersion-compensating optical fibers having positive dispersion are inserted into the transmission line as appropriate. Such a configuration suppresses four wave mixing among wavelength channels while precluding the accumulated dispersion value of signal light from excessively increasing. The wavelength at which the amounts of positive and negative dispersions are well-balanced is referred to as an "average zero dispersion wavelength", around which the signal waveform does not significantly vary despite the group velocity dispersion occurring in the middle of transmission.

In a wavelength-division multiplexed transmission system, a plurality of wavelength channels having different wavelengths are transmitted through a single optical fiber transmission line. Although dispersions are not accumulated for signal light located near the average zero dispersion wavelength, the dispersion slope causes negative or positive dispersions to be gradually accumulated in channels having a wavelength shorter or longer than the average zero dispersion wavelength, respectively. Accordingly, the signal waveform gradually varies from its original state.

The variation of the waveform caused by the accumulated dispersions is reversible. Thus, the waveform can be restored to its original state by adding dispersions of the same magnitude as the accumulated dispersion value but of the opposite sign to the signal at the receiving terminal. On the other hand, the self phase modulation is an irreversible process. Thus, when it occurs after the waveform has been changed due to the accumulated dispersions, the waveform cannot be restored even by compensating for the dispersions at the receiving terminal. This is the degradation of the waveform caused by the SPM-GVD effect. Since the SPM-GVD effect depends on the amount of accumulated dispersions in the optical fiber transmission line, it is more significant in channels assigned for wavelengths located further from the average zero dispersion wavelength.

The intensity of signal light through the transmission line is desirably reduced in order to suppress the degradation of the waveform caused by the SPM-GVD effect. This is because the self phase modulation is more and more noticeable as the light intensity is higher and higher. The reduction of the signal light intensity, however, is limited because it leads to the degradation of the signal to noise ratio. One of the current techniques for suppressing the waveform degradation other than the minimization of the signal light intensity is the superposition of prechirp on signal light. This technique is closely related to polarization scramble, that is, a technique for suppressing the polarization dependent effect occurring in the transmission line. This will be described in detail below.

Besides the SPM-GVD effect, the polarization dependent effect occurring in the transmission line causes the waveform to be degraded during passage through the optical fiber transmission line. The polarization dependent effect refers to the dependency of the transmission characteristics of optical fibers on the polarization state of signal light, and includes, for example, polarization dependent loss.

The polarization dependency will be explained with reference to the conceptual cross-sectional view of an optical fiber transmission line shown in FIG. 1. For example, the transmission characteristics are assumed to differ between the polarization of signal light in the direction shown by arrow 30 and the polarization in the direction shown by arrow 32. In this case, the signal to noise ratio of signal light upon arrival at an optical receiver varies depending on its polarization state during passage through the optical fiber transmission line. As a result, the transmission characteristics vary over time.

An invention for suppressing the polarization dependent effect occurring in the optical fiber transmission line is described in Japanese Patent Laid-Open Publication No. 8-111662. To suppress the polarization dependent effect occurring in the transmission line, this invention applies bit-synchronized polarization scramble to signal light output from an optical transmitter. The bit-synchronized polarization scramble smoothes polarized signal light for each bit to eliminate polarization. This technique smoothes the polarization dependent effect for each bit to prevent the transmission characteristics from varying depending on the polarization state of signal light.

The polarization scramble, however, suppresses the polarization dependent effect occurring in the transmission line but has few effects on the degradation of the waveform caused by the SPM-GVD effect. Although, however, not specified in Japanese Patent Laid-Open Publication No. 8-111662, phase modulation provided by the bit rate frequency is necessarily superposed on signal light during the bit-synchronized polarization scramble. This bit-synchronized phase modulation (prechirp) is effective in preventing the waveform from being degraded due to the SPM-GVD effect. This is described in, for example, Document A, which is shown below.

Document A: Neal S. Bergano et. al., Optical Fiber Communication Conference '96, TuN1, 1996

The effect of the bit-synchronized polarization scramble in suppressing the SPM-GVD effect is particularly significant in systems having a bit rate of 5 Gb/s or less per channel, and is used in the transmission experiments in Documents B and C, which are shown below.

Document B: Neal S. Bergano et. al., Optical Fiber Communication Conference '97, PD16, 1997 Document C: N. Shimojoh et. al., Electronics Letters, vol. 33, No. 10, PP.877–879, 1997

Figure 2:
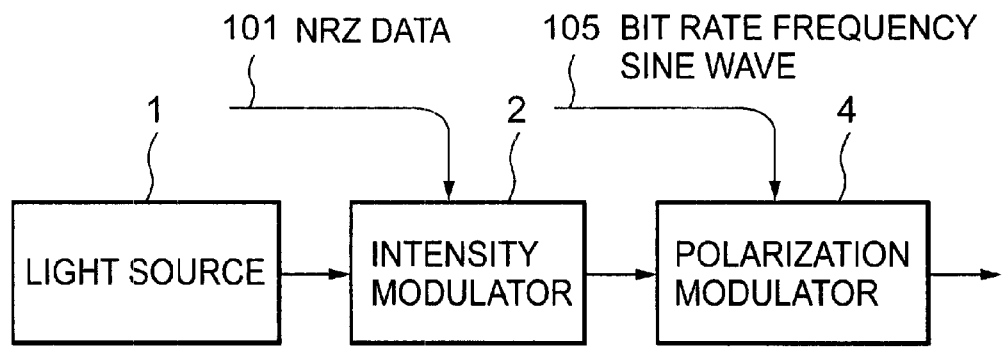
FIG. 2 is a block diagram showing a configuration of an optical transmitter in a conventional optical transmission system.
Figure 3:
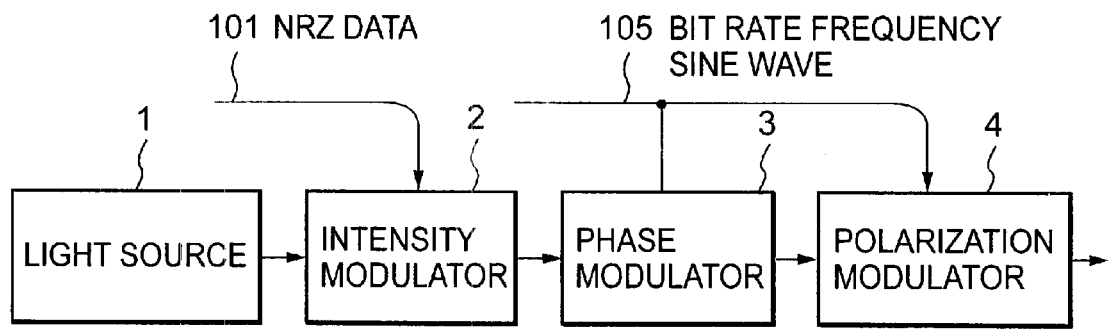
FIG. 3 is a block diagram showing a configuration of an optical transmitter in another conventional optical transmission system.

FIG. 2 shows an optical transmitter of the configuration used in Document C, and FIG. 3 shows an optical transmitter of the configuration used in Document D.

Document D: M. Suzuki et. al., Optical Fiber Communication Conference '98, PD17, 1998

The optical transmitter shown in FIG. 2 is configured of a light source 1, an intensity modulator 2, and a polarization modulator 4.

The intensity modulator 2 modulates the intensity of signal light input from the light source 1 based on RZ (Return to Zero) data 101.

The polarization modulator 4 modulates the polarization of the signal light input from the intensity modulator 2 according to the level of a bit rate frequency sine wave 105.

The optical transmitter in FIG. 3 additionally includes a phase modulator 3 between the polarization modulator 4 and the intensity modulator 2 compared to the optical transmitter in FIG. 2. Document D describes transmission experiments for both bit rates of 5 and 10 Gb/s per channel. In the case of the bit rate of 10 Gb/s, however, the depth of prechirp applied for the bit-synchronized polarization modulation is not optimal for suppressing the degradation of the waveform caused by the SPM-GVD effect, so a phase modulator 3 is provided to optimize the depth of prechirp.

Signal light from the conventional optical transmitter (FIG. 2 or 3) is subjected to the bit-synchronized polarization scramble through polarization modulation provided by the bit rate frequency sine wave 105, thereby enabling the polarization dependent effect to be suppressed as described above. In addition, the superposition of the bit-synchronized phase modulation (prechirp) restrains the degradation of the waveform caused by the SPM-GVD effect.

Even with this method, however, the band in which the degradation of the waveform caused by the SPM-GVD effect is not very significant after transmission over a very long distance of 10,000 km is narrow, that is, nearly 8 nm around the average zero dispersion, thereby enabling only about 10 wavelength channels to be located therein. Accordingly, to implement high-capacity transmissions in the future, a new technique is required for sufficiently suppressing the degradation of the waveform caused by the SPM-GVD effect.

The embodiments of the present invention will be described in detail with reference to the drawings.

First Embodiment

Figure 4:
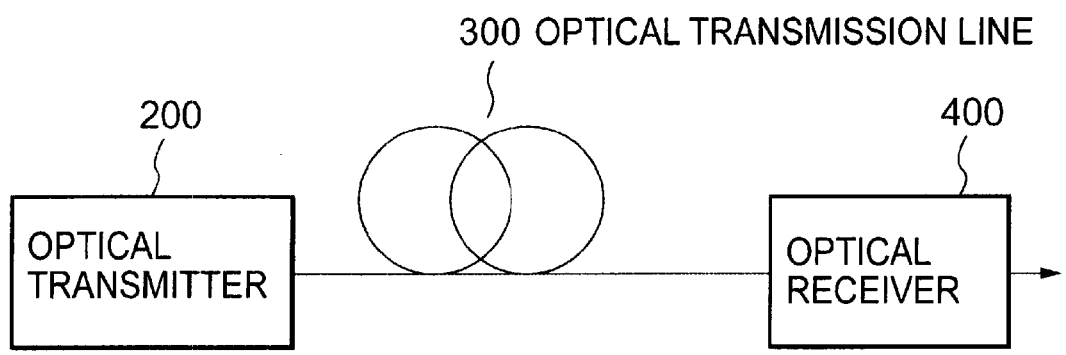
FIG. 4 shows a configuration of an optical transmission system according to the present invention.

First, an optical transmission system according to a first embodiment of the present invention will be described. FIG. 4 shows a configuration of the first embodiment of the optical transmission system according to the present invention. The optical transmission system in FIG. 4 is configured of an optical transmitter 200, an optical fiber transmission line 300, and an optical receiver 400.

Figure 5:
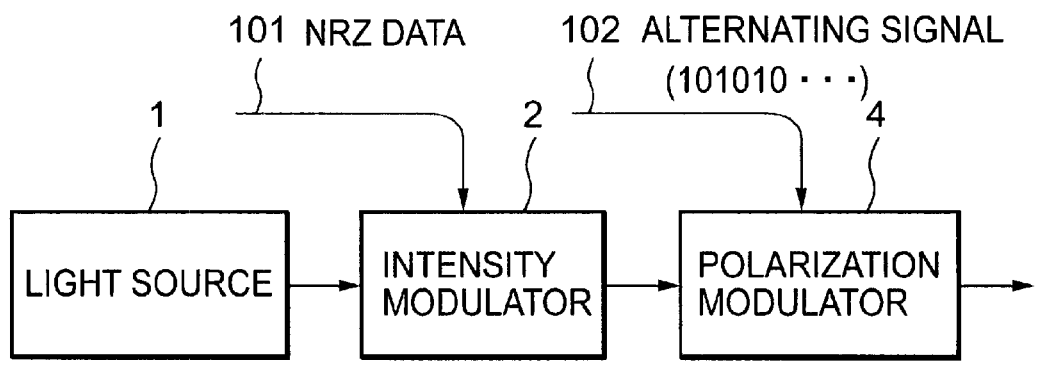
FIG. 5 is a block diagram showing a configuration of an optical transmitter in an optical transmission system according to a first embodiment of the present invention.

FIG. 5 is a block diagram showing a configuration of the optical transmitter 200 in the optical transmission system according to this embodiment. The same components as in FIG. 2 have the same reference numerals as in this figure. The optical transmitter 200 is configured of the light source 1, the intensity modulator 2, and the polarization modulator 4.

The intensity modulator 2 modulates the intensity of signal light from the light source 1 based on the NRZ (Non Return to Zero) data 101 that is transmission data prior to output.

The polarization modulator 4 modulates the polarization of the signal light output from the intensity modulator 2 using an alternating signal 102 prior to output.

The alternating signal 102 has the same period as the NRZ data 101 and consists of the sequence "101010 . . . " wherein the adjacent bits are mutually inverse.

Next, the operation of this embodiment will be described with reference to FIGS. 6 and 7.

Figure 6:
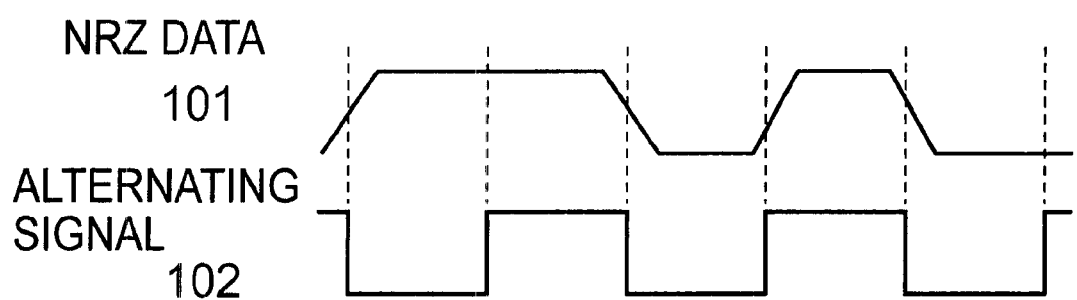
FIG. 6 is a timing chart showing operations of an intensity modulator 2 and a polarization modulator 4, which are shown in FIG. 5.

FIG. 6 is a timing chart showing the waveforms of the NRZ data 101 and alternating signal 102, and FIG. 7 is a type drawing of signal light.

The intensity modulator 2 modulates the intensity of signal light from the light source 1 using the NRZ modulation method. The polarization modulator 4 subsequently modulates the polarization of the intensity-modulated signal light based on the alternating signal 102. The polarization modulation modulates the polarizations of the adjacent bits in the signal light so as to be orthogonal to each other.

Figure 7A:
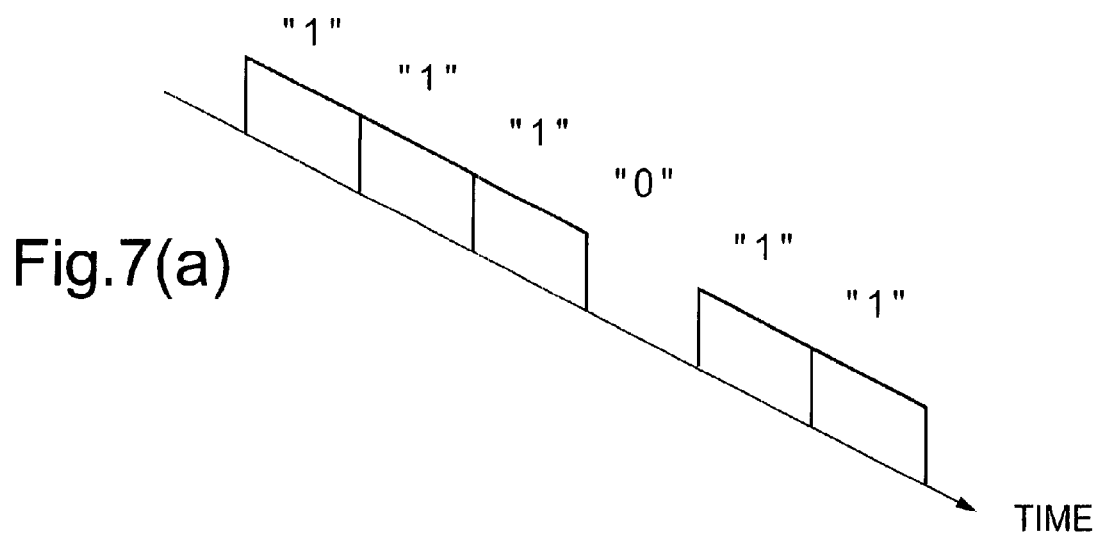
FIG. 7(a) shows intensity-modulated signal light.
Figure 7B:
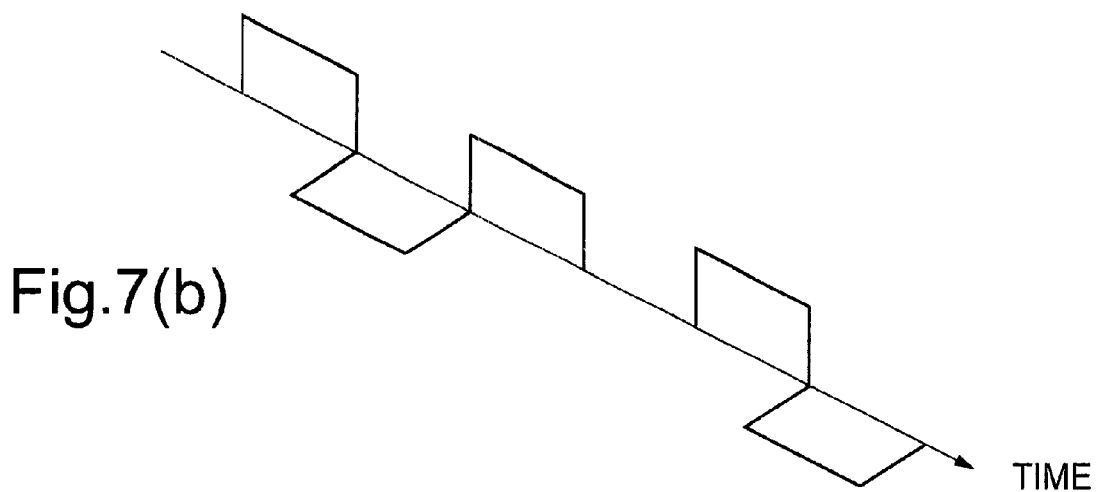
FIG. 7(b) shows polarization-modulated signal light.
Figure 7C:
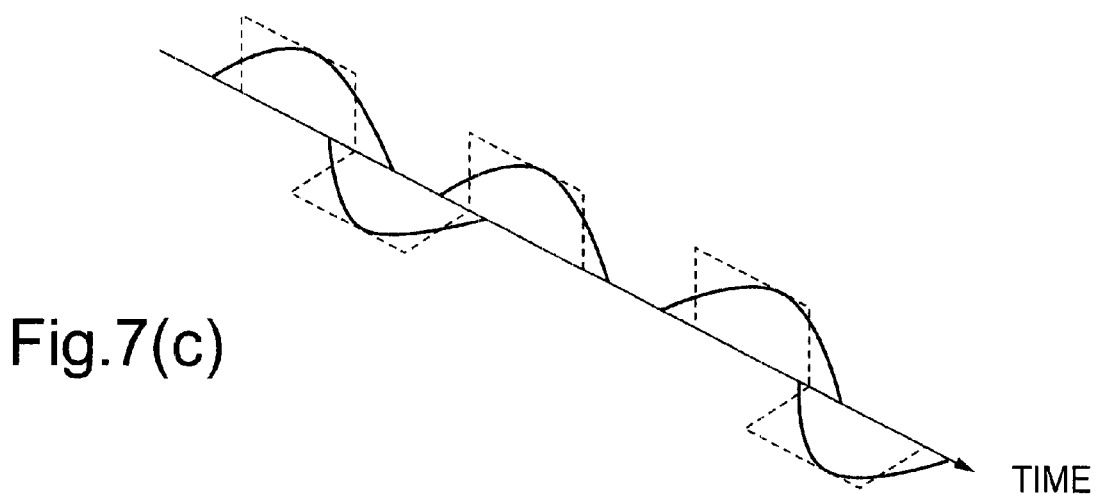
FIG. 7(c) shows signal light obtained after passing through an optical fiber.

In the optical transmission system according to this embodiment, the intensity-modulated signal light shown in FIG. 7(a) has its polarization modulated prior to transmission so that the temporally adjacent bits are mutually orthogonal in terms of polarization. Thus, even when the polarization-modulated signal light shown in FIG. 7(b) is degraded by the group velocity dispersion effect caused by passage through the optical fiber transmission line, the interference between the temporally adjacent bits does not significantly affect the light, as shown in FIG. 7(c). Thus, the degradation of the waveform caused by the SPM-GVD effect can be suppressed.

The following has been shown by detailed examinations of the degradation of the waveform caused by the SPM-GVD effect when the bit-synchronized phase modulation is used. The distortion of the waveform caused by the wavelength dispersion in the transmission line causes the adjacent bits to mutually interfere. In this condition, when a nonlinear effect occurs, the amount of waveform distortion at the receiving terminal is determined by the degree of this effect. Thus, by preventing the longitudinally adjacent bits in bit-synchronized phase-modulated signal light from mutually interfering when wavelength dispersion causes the waveform to be distorted, the degradation of the waveform caused by the SPM-GVD effect can be restrained.

The optical transmission system according to this embodiment uses this function to suppress the degradation of the waveform caused by the SPM-GVD effect.

In all of the following embodiments, with respect to the order in which the intensity modulator 2, the phase modulator 3, and the polarization modulator 4 are arranged, the intensity modulator 2 and the phase modulator 3 can be arranged in an arbitrary order, but the polarization modulator 4 must be placed at the trailing end of the system because the intensity modulator 2 and the phase modulator 3 generally have a polarization dependency.

Since this optical transmission system transmits data based on the intensity of an optical signal, the intensity is not changed even when the signal light is phase- or polarization-modulated. Accordingly, the optical receiver 400 in the optical transmission system according to this embodiment may comprise a conventionally common receiver that simply converts the intensity of input light into an electric signal.

Second Embodiment

Next, an optical transmission system according to a second embodiment of the present invention will be explained. The general configuration of the optical transmission system according to this embodiment is the same as in the first embodiment.

Figure 8:
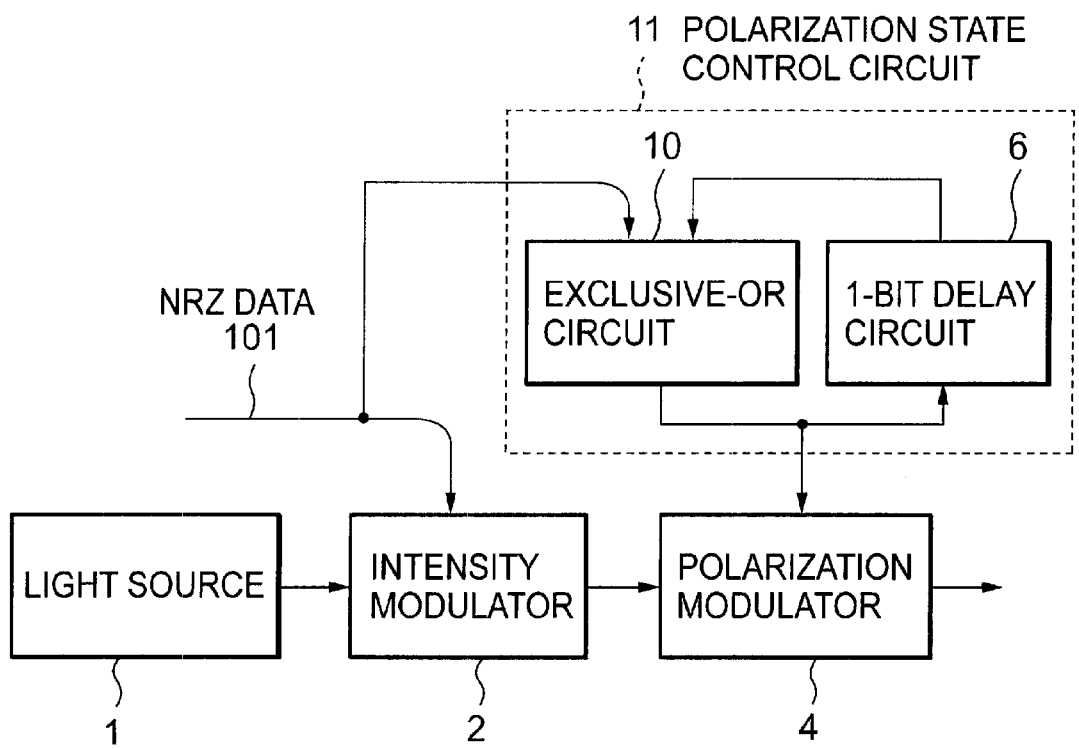
FIG. 8 is a block diagram showing a configuration of an optical transmitter in an optical transmission system according to a second embodiment of the present invention.

FIG. 8 is a block diagram showing a configuration of the optical transmitter 200 in the optical transmission system according to this embodiment. In FIG. 8 the same components as in FIG. 5 have the same reference numerals.

The optical transmitter 200 is configured of the light source 1, the intensity modulator 2, the polarization modulator 4, and a polarization state control circuit 11.

The polarization state control circuit 11 is configured of an exclusive-OR circuit 10 and a 1-bit delay circuit 6.

The 1-bit delay circuit 6 delays a polarization state control signal output from the exclusive-OR circuit 10, by 1 bit prior to output.

The exclusive-OR circuit 10 calculates the exclusive OR between the NRZ data 101 and the output signal from the 1-bit delay circuit 6, and outputs the results of calculation as a polarization state control signal.

This configuration allows the exclusive-OR circuit 10 to output a polarization state control signal obtained by inverting the logic of a signal output from the 1-bit delay circuit 6 (that is, the signal output from the exclusive-OR circuit 10 as the last bit).

Since the polarization modulator 4 modulates polarization based on the polarization state control signal, it carries out modulation such that the polarization of signal light from the intensity modulator 2 orthogonalizes the polarization of the last bit each time the NRZ data 101 becomes "1".

Figure 9:
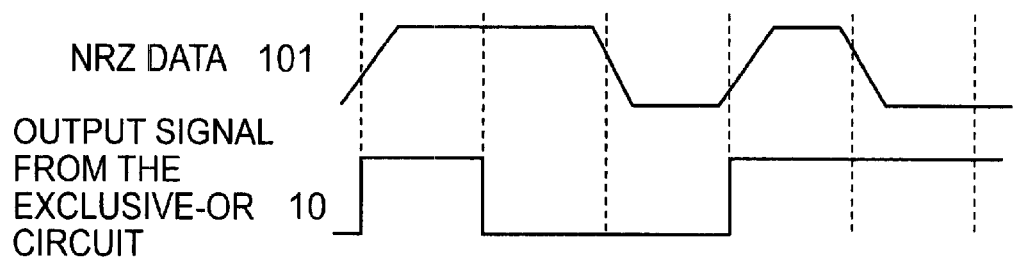
FIG. 9 is a timing chart showing operations of an intensity modulator 2 and a polarization modulator 4, which are shown in FIG. 8.

FIG. 9 is a timing chart showing operations of the intensity modulator 2 and polarization modulator 4.

The first embodiment provides polarization modulation such that polarizations are mutually orthogonal every other bit. This is the simplest method for configuring the optical transmission system. When, however, the bit next to a certain bit has the digit "0" (signal light off state), it is meaningless to switch the polarization state between these two bits. This is because the second bit inherently has no signal light power and thus does not interfere despite the absence of the switching of the polarization state.

Next, the modulation method according to this embodiment will be explained with reference to specific examples. For example, there is assumed to be a signal sequence of continuous 10 bits. The upper stage indicates the order of the bits, while the lower stage indicates the signal.

| 1 | 2 | 3 | 4 | 5 | 6 | 7 | 8 | 9 | 10 | (order) |
|---|---|---|---|---|---|---|---|---|----|---------|
| 1 | 0 | 1 | 1 | 1 | 0 | 1 | 1 | 1 | 0  |         |

When the polarization is modulated using the method according to the first embodiment, the odd-number bits and even-number bits will have different polarization states. For example, the fifth "1" signal may be interfered with by four bits providing the "1" signal and including the first, third, seventh, and ninth bits.

When the polarization is modulated so that the polarizations of the 10-bit signal sequence cross each other each time the "1" signal (signal light on state) appears, the following sequence can be obtained.

| 1 | 2 | 3 | 4 | 5 | 6 | 7 | 8 | 9 | 10 | (order) |
|---|---|---|---|---|---|---|---|---|----|---------|
| 1 | 0 | 1 | 1 | 1 | 0 | 1 | 1 | 1 | 0  |         |
| ○ | ○ | ● | ○ | ● | ● | ○ | ● | ○ | ○  |         |

○ and ● indicate the polarization states, and bits with the same mark have the same polarization state. In this case, the fifth "1" signal may be interfered with by two bits providing the "1" signal and including the third and eighth bits. Thus, this embodiment can reduce the number of bits that may interfere compared to the first embodiment.

As shown above, by modulating the polarization so that the polarizations cross each other each time the "1" signal (signal light on state) appears, the number of bits that may interfere can be reduced compared to the method providing polarization modulation every other bit. As a result, the degradation of the wavelength can be restrained.

Third Embodiment

Figure 10:
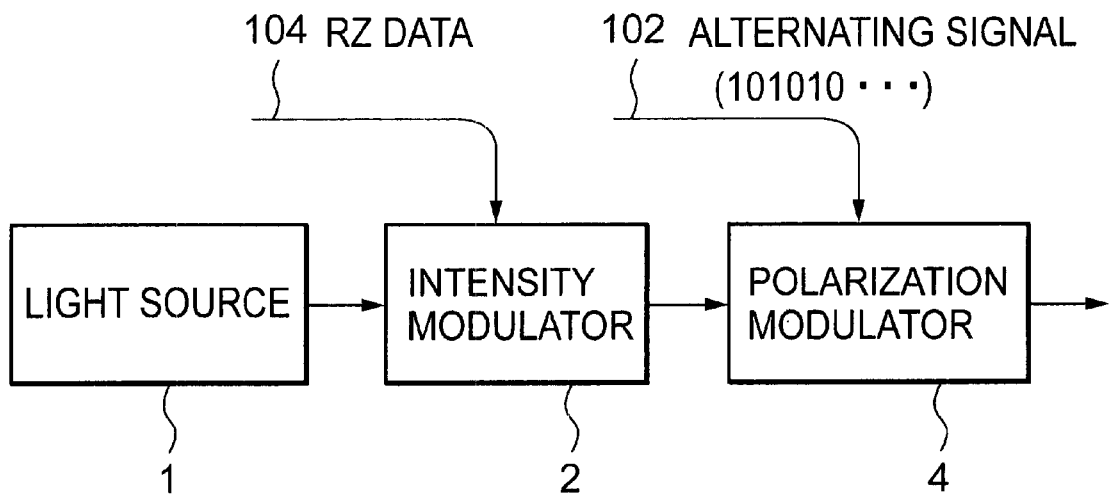
FIG. 10 is a block diagram showing a configuration of an optical transmitter in an optical transmission system according to a third embodiment of the present invention.

Next, an optical transmission system according to a third embodiment of this invention will be described. The general configuration of the optical transmission system and the basic configuration of the optical transmitter 200 according to this embodiment are the same as in the first embodiment. FIG. 10 shows a configuration of the optical transmitter 200 used for this embodiment. This optical transmitter differs from the first embodiment in that instead of the NRZ data, the RZ (Return-to-Zero) data 104 is used for intensity modulation. With respect to intensity modulation methods for long-distance transmissions, the RZ modulation can suppress the degradation of the waveform caused by the non-linear effect more easily than the NRZ modulation and serves to provide excellent transmission characteristics.

The SPM-GVD effect in this embodiment can be further suppressed using the intensity modulation method that uses the RZ signal as transmission data. The reason is shown below.

First, the RZ modulation inherently has superior receiver sensitivity to the NRZ modulation. This effect is significant in long-distance transmissions in which the optical SNR is substantially degraded after transmission.

Second, chirp associated with the polarization modulation can be reduced. During the polarization modulation, relatively large chirp is added to the signal light in the gap between the bits. In the NRZ modulation, signal power may be present in the gap between the bits, so the signal is likely to be affected by the chirp. On the contrary, the RZ modulation involves no signal power in the gap between the bits, thereby avoiding the adverse effect of the chirp.

The RZ modulation using a single intensity modulator requires an electric circuit for driving the modulator and also requires the intensity modulator to have a frequency bandwidth almost double that in the NRZ modulation. When fast electric circuit and intensity modulator cannot be produced easily, two or more intensity modulators can be used for the RZ modulation, as described in Documents B and D.

Figure 11:
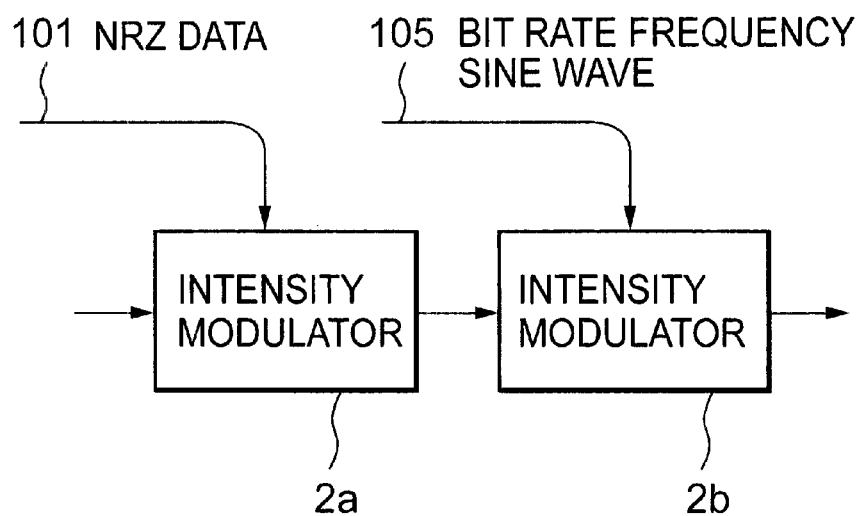
FIG. 11 is a block diagram showing a configuration of another intensity modulator for RZ modulation according to the third embodiment of the present invention.

FIG. 11 shows a configuration of an intensity modulator in the case in which two such intensity modulators are used for the RZ modulation.

The following embodiments using the RZ modulation method as the intensity modulation method use a single intensity modulator or the intensity modulator in FIG. 11.

Fourth Embodiment

Figure 12:
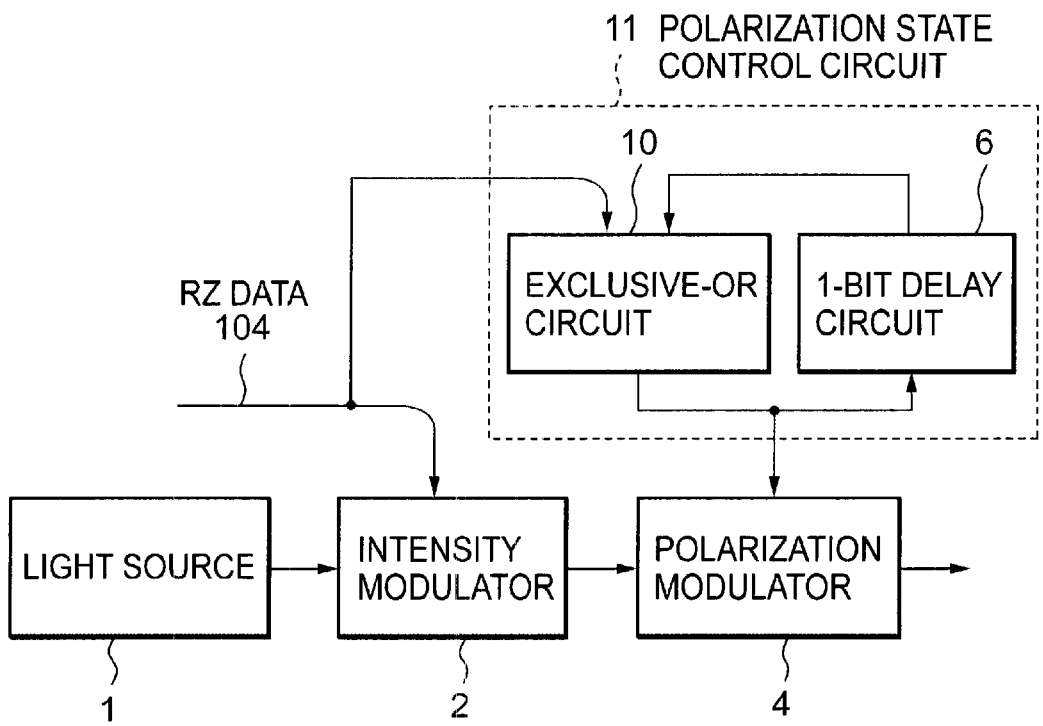
FIG. 12 is a block diagram showing a configuration of an optical transmitter in an optical transmission system according to a fourth embodiment of the present invention.

Next, an optical transmission system according to a fourth embodiment of the present invention will be described. The general configuration of the optical transmission system and the basic configuration of the optical transmitter 200 according to this embodiment are the same as in the second embodiment. FIG. 12 shows a configuration of the optical transmitter 200 used for this embodiment. This optical transmitter differs from the second embodiment in that the RZ data 104 is used for intensity modulation. Compared to the optical transmission system according to the second embodiment, this embodiment further improves the transmission characteristics, as in the third embodiment.

Fifth Embodiment

Next, an optical transmission system according to a fifth embodiment of this invention will be explained. The general configuration of the optical transmission system according to this embodiment is the same as in the first embodiment.

Figure 13:
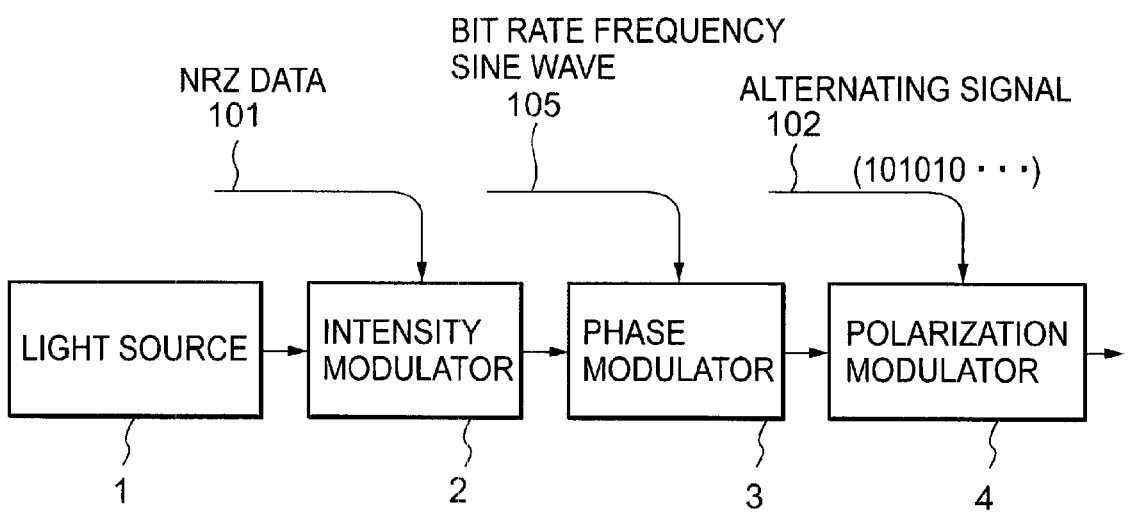
FIG. 13 is a block diagram showing a configuration of an optical transmitter in an optical transmission system according to a fifth embodiment of the present invention.

The optical transmitter 200 is configured of the light source 1, the intensity modulator 2, the phase modulator 3, and the polarization modulator 4, as shown in FIG. 13. The same components as in FIG. 5 have the same reference numerals.

Figure 14:
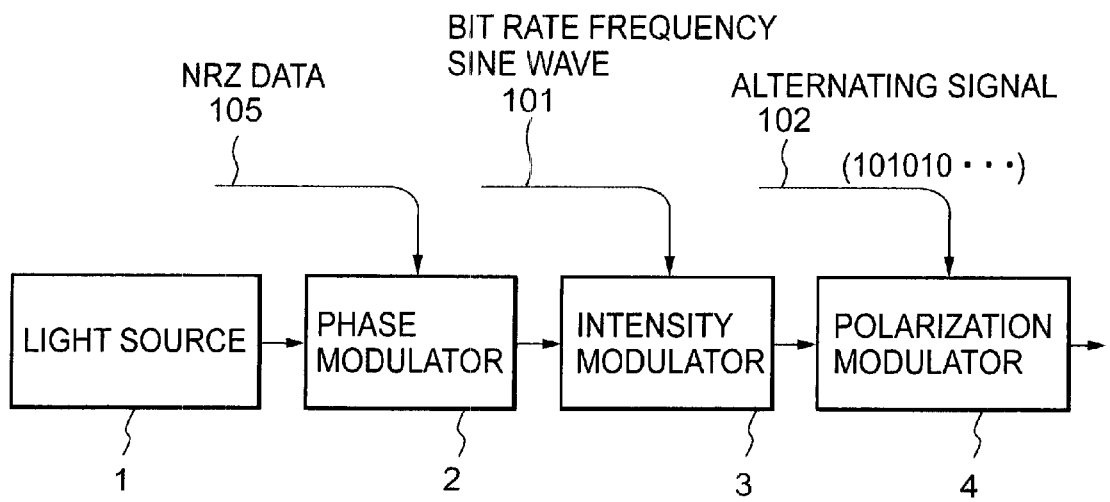
FIG. 14 is a block diagram showing another configuration of the optical transmitter in the optical transmission system according to the fifth embodiment of the present invention.
Figure 15:
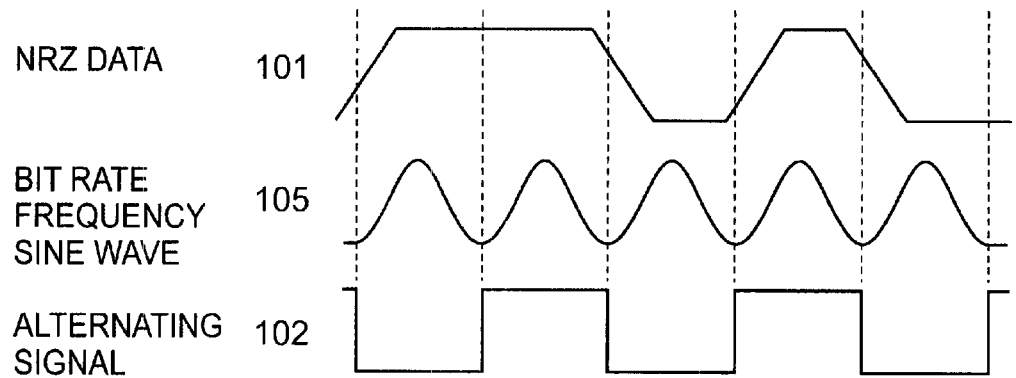
FIG. 15 is a timing chart showing operations of an intensity modulator 2 and a polarization modulator 4, which are shown in FIG. 13.

The intensity modulator 2 modulates the intensity of signal light from the light source 1 according to the NRZ data 101. Next, the phase modulator 3 modulates the phase of the intensity-modulated signal light based on a bit rate frequency sine wave 105 corresponding to the bit rate frequency of the signal. The polarization modulator 4 then modulates the polarization of the phase-modulated signal light based on the alternating signal 102 so that the temporally adjacent bits are mutually orthogonal in terms of polarization. The intensity modulator 2 and the phase modulator 3 can be connected in the reverse order. FIG. 14 shows a configuration with the reverse order. In this case, an output from the intensity modulator 2 is input to the polarization modulator 4. FIG. 15 shows timings for the operations of the intensity modulator 2, phase modulator 3, and polarization modulator 4.

As described in Document A, the degradation of the waveform caused by the SPM-GVD effect can be suppressed by modulating (applying prechirp to) the phase of the intensity-modulated signal light using a repeated wave corresponding to the bit rate frequency. This embodiment uses both the prechirp and the polarization modulation for avoiding the interference between adjacent bits, in order to further improve the effect of suppressing the degradation of the waveform caused by the SPM-GVD effect.

Sixth Embodiment

Figure 16:
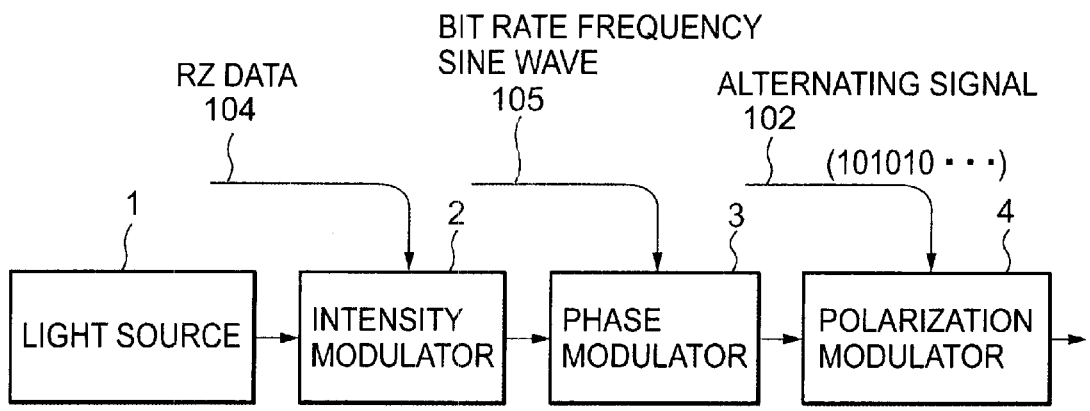
FIG. 16 is a block diagram showing a configuration of an optical transmitter in an optical transmission system according to a sixth embodiment of the present invention.

Next, a sixth embodiment of this invention will be described. The general configuration of the optical transmission system according to this embodiment is the same as in the first embodiment. FIG. 16 shows a configuration of the optical transmitter 200 used for this embodiment. Its basic configuration is the same as in the fifth embodiment. This optical transmitter differs from the fifth embodiment in that the RZ data is used for intensity modulation. Compared to the fifth embodiment, the optical transmission system according to this embodiment further improves the transmission characteristics using the RZ modulation method.

Seventh Embodiment

Figure 17:
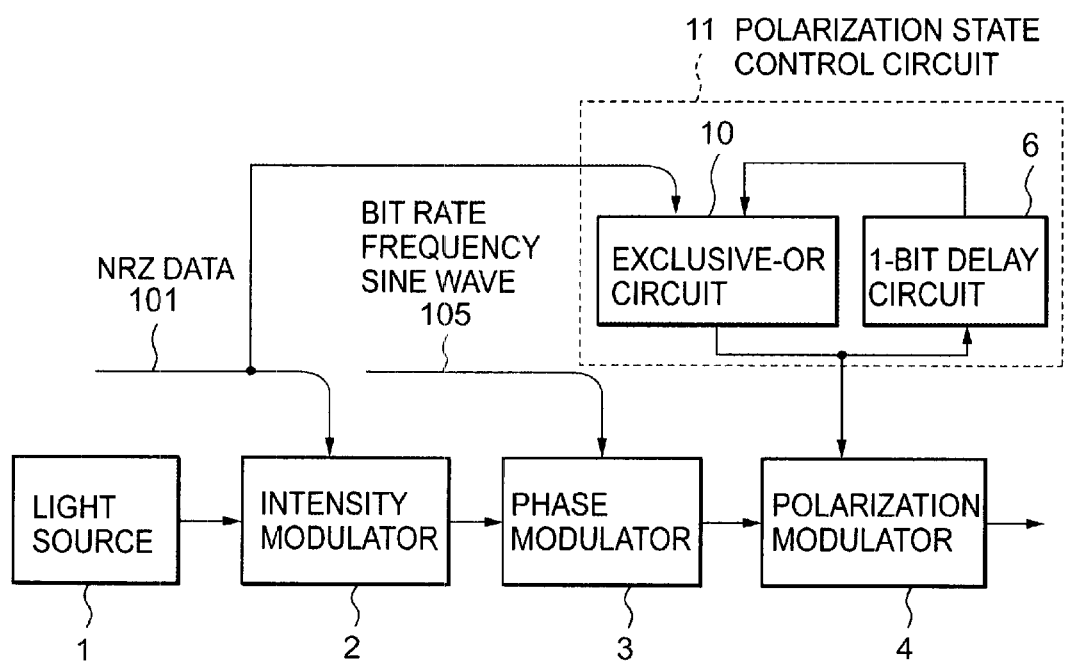
FIG. 17 is a block diagram showing a configuration of an optical transmitter in an optical transmission system according to a seventh embodiment of the present invention.
Figure 18:
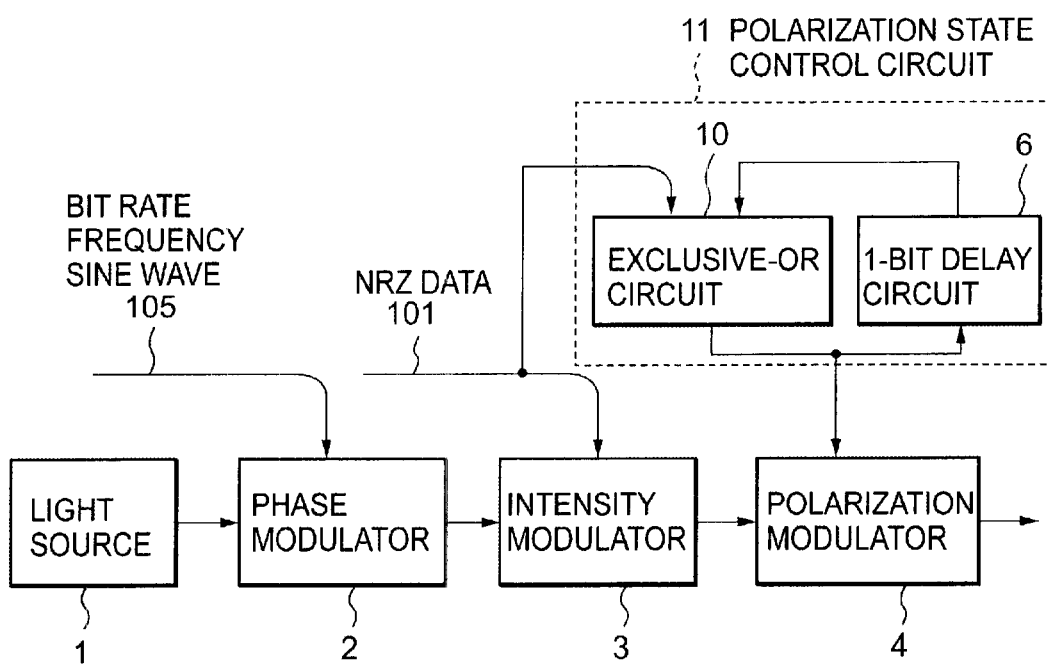
FIG. 18 is a block diagram showing another configuration of the optical transmitter in the optical transmission system according to the seventh embodiment of the present invention.
Figure 19:
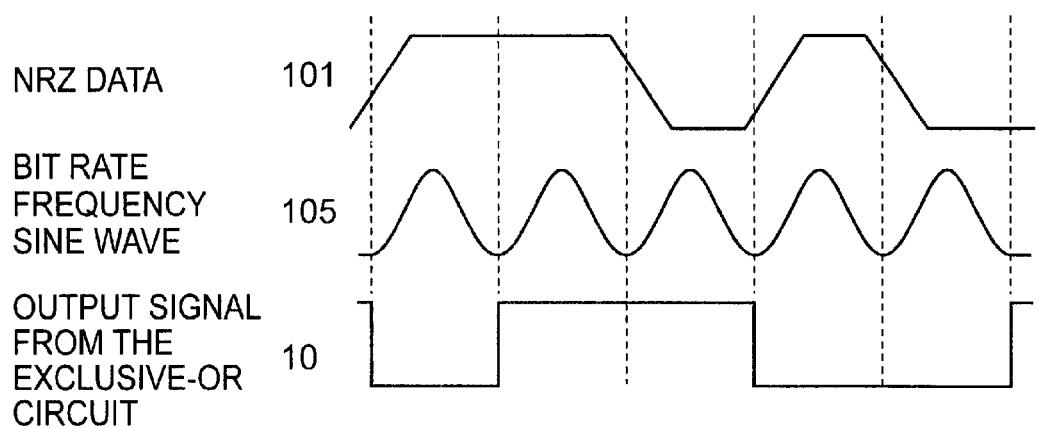
FIG. 19 is a timing chart showing operations of an intensity modulator 2 and a polarization modulator 4, which are shown in FIG. 17.

Next, a seventh embodiment of this invention will be explained. The general configuration of the optical transmission system according to this embodiment is the same as in the first embodiment. FIG. 17 shows a configuration of the optical transmitter 200 used for this embodiment. The optical transmitter 200 is configured of the light source 1, the intensity modulator 2, the phase modulator 3, and the polarization modulator 4. The intensity modulator 2 modulates the intensity of signal light from the light source 1 according to the NRZ modulation method. Subsequently, the phase modulator 3 modulates the phase of the signal light using a repeated wave corresponding to the bit rate frequency of the signal. The polarization modulator 4 then modulates the polarization of the signal light so that the polarizations cross each other each time the "1" signal (signal light on state) appears. The intensity modulator 2 and the phase modulator 3 can be connected in the reverse order. FIG. 18 shows a configuration with the reverse order. In this case, an output from the intensity modulator 2 is input to the polarization modulator 4. FIG. 19 shows timings for the operations of the intensity modulator, phase modulator, and polarization modulator.

Eighth Embodiment

Figure 20:
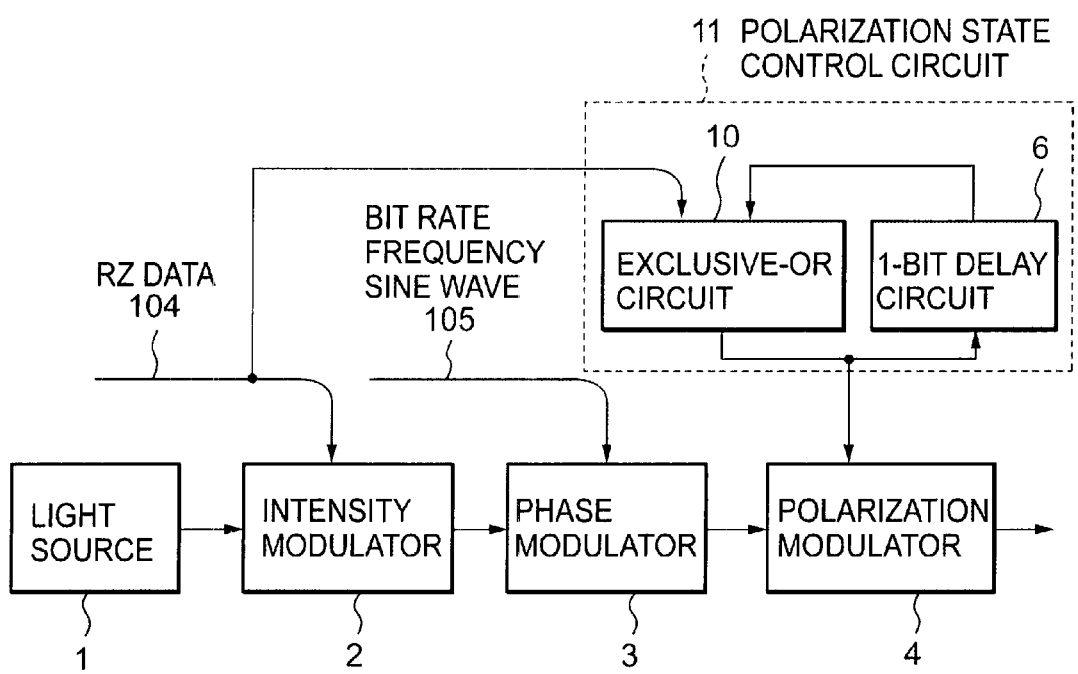
FIG. 20 is a block diagram showing a configuration of an optical transmitter in an optical transmission system according to an eighth embodiment of the present invention.

Next, an eighth embodiment of this invention will be described. The general configuration of the optical transmission system according to this embodiment is the same as in the first embodiment. FIG. 20 shows a configuration of the optical transmitter 200 according to this embodiment. Its basic configuration according to this embodiment is the same as in the seventh embodiment. This optical transmitter differs from the seventh embodiment in that the RZ modulation is used as the intensity modulation method. Compared to the seventh embodiment, this embodiment further improves the transmission characteristics using the RZ modulation method.

Ninth Embodiment

Figure 21:
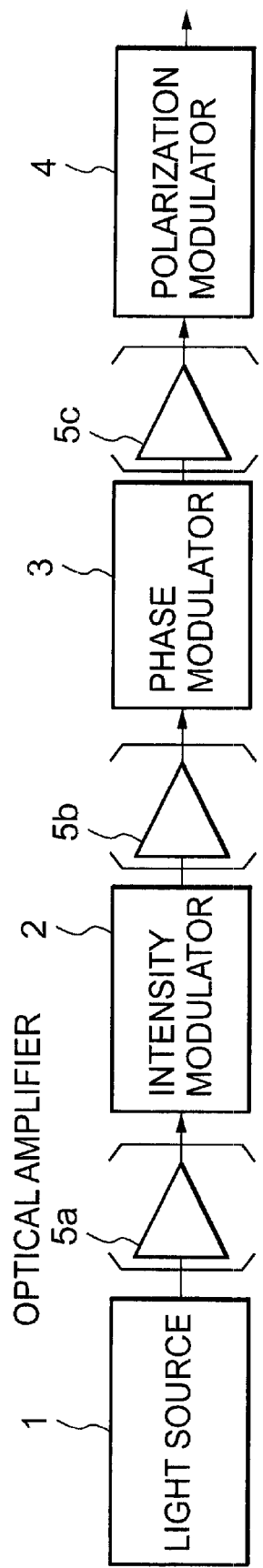
FIG. 21 is a block diagram showing a configuration of an optical transmitter in an optical transmission system according to a ninth embodiment of the present invention.

Next, a ninth embodiment of this invention will be described. The general configuration of the optical transmission system according to this embodiment is the same as in the first embodiment. FIG. 21 shows a configuration of the optical transmitter 200 according to this embodiment. This embodiment inserts at least one of three optical amplifiers 5a to 5c between the light source 1 and the intensity modulator 2, between the intensity modulator 2 and the phase modulator 3 and/or between the phase modulator 3 and the polarization modulator 4.

In general, signal light is subjected to a loss of 3 to 8 dB after passage through a single modulator. According to the configurations of the optical transmitters shown in FIGS. 5 and 8, signal light from the light source 1 undergoes a large loss due to passage through the three modulators, so it cannot maintain an appropriate signal to noise ratio easily. Thus, this embodiment uses the optical amplifiers 5a to 5c to compensate for the loss occurring after passage through each modulator. This configuration can prevent the signal to noise ratio from being degraded due to passage through multiple modulators.

As described above, the present invention can suppress the degradation of the waveform caused by the SPM-GVD effect in the long-distance wavelength-division multiplexed optical transmission system, in order to improve the transmission characteristics. Thus, this invention enables appropriate transmission despite dispersions larger than in the prior art to allocate the wavelength of a light source of transmitter over a wider wavelength region. Accordingly, the number of wavelength channels can be increased to improve the transmission capacity.

While this invention has been described in connection with certain preferred embodiments, it is to be understood that the subject matter encompassed by way of this invention is not to be limited to those specific embodiments. On the contrary, it is intended for the subject matter of the invention to include all alternatives, modification, and equivalents as can be included within the spirit and scope of the following claims.

What is claimed is:

1. An optical transmitter comprising an optical modulator for modulating the intensity of input light based on transmission data to output the modulated light, and a polarization modulator for modulating the polarization of said modulated light based on a polarization modulation signal, wherein: each bit of said polarization modulation signal has the same time interval as each bit of said transmission data, and said polarization modulator sets the polarization of each bit of said modulated light to one of two orthogonal polarizations for output, according to said polarization modulation signal.

2. The optical transmitter according to claim 1, wherein: said polarization modulation signal includes a pattern alternating a high and a low levels for each bit.

3. The optical transmitter according to claim 1, wherein: said transmission data includes an RZ signal.

4. The optical transmitter according to claim 1, wherein: said optical transmitter further comprises a polarization state control circuit for generating said polarization modulation signal so that a logic is inverted for bits having a value for the larger intensity of said modulated light.

5. The optical transmitter according to claim 4, wherein: said transmission data includes an RZ signal.

6. The optical transmitter according to claim 1, wherein: said optical transmitter further comprises a polarization state control circuit for generating said polarization modulation signal, and wherein: said polarization state control circuit comprises:

an exclusive-OR circuit having a first input terminal to which said transmission data is input, and
   an 1-bit delay circuit for delaying an output from said exclusive-OR circuit by one bit to supply it to a second input terminal of said exclusive-OR circuit.

7. The optical transmitter according to claim 1, wherein: said optical modulator further modulates the phase of said input light based on a bit rate frequency sine wave that is a sine wave of a frequency corresponding to the bit rate of said transmission data.

8. The optical transmitter according to claim 1, wherein: said optical modulator comprises:

an intensity modulator for modulating the intensity of said input light based on said transmission data in order to output the intensity-modulated light; and
   a phase modulator for modulating the phase of said intensity modulated light based on a bit rate frequency sine wave that is a sine wave of a frequency corresponding to the bit rate of said transmission data.

9. The optical transmitter according to claim 8, wherein: said polarization modulation signal includes a bit pattern alternating a high and a low levels for each bit.

10. The optical transmitter according to claim 8, wherein: said transmission data includes an RZ signal.

11. The optical transmitter according to claim 8, wherein: said optical transmitter further comprises a polarization state control circuit for generating said polarization modulation signal so that a logic is inverted for bits having a value for the larger intensity of said modulated light.

12. The optical transmitter according to claim 11, wherein:
said transmission data includes an RZ signal.

13. The optical transmitter according to claim 8, wherein:
said optical transmitter further comprises a polarization state control circuit for generating said polarization modulation signal, and
said polarization state control circuit comprises: an exclusive-OR circuit having a first input terminal to which said transmission data is input; and
a 1-bit delay circuit for delaying an output from said exclusive-OR circuit by one bit to supply it to a second input terminal of said exclusive-OR circuit.

14. The optical transmitter according to claim 8, wherein:
said optical transmitter further comprises: at least one optical amplifier inserted in at least one of a position in front of said intensity modulator, a position between said intensity modulator and said phase modulator and a position between said phase modulator and said polarization modulator.

15. The optical transmitter according to claim 8, wherein:
said optical transmitter further comprises:
a light source for supplying said input light to said optical modulator.

16. The optical transmitter according to claimed wherein:
said intensity modulator comprises: a first optical-intensity modulator for modulating the intensity of said input light according to said transmission data; and
a second optical-intensity modulator for modulating the intensity of an output from said first optical-intensity modulator according to a bit rate frequency sine wave that is a sine wave of a frequency -corresponding to the bit rate of said transmission data.

17. The optical transmitter according to claim 1, wherein:
said optical modulator comprises:
a phase modulator for modulating the phase of said intensity-modulated light based on a bit rate frequency sine wave that is a sine wave of a frequency corresponding to the bit rate of said transmission data; and
an intensity modulator for modulating the intensity of said phase-modulated light based on said transmission data.

18. The optical transmitter according to claim 17, wherein:
said polarization modulation signal includes a bit pattern alternating a high and a low levels for each bit.

19. The optical transmitter according to claim 17, wherein:
said transmission data includes an RZ signal.

20. The optical transmitter according to claim 17, wherein:
said optical transmitter further comprises a polarization state control circuit for generating said polarization modulation signal so that a logic is inverted for bits having a value for the larger intensity of said modulated light.

21. The optical transmitter according to claim 20, wherein:
said transmission data includes an RZ signal.

22. The optical transmitter according to claim 17, wherein:
said optical transmitter further comprises a polarization state control circuit for generating said polarization modulation signal, and
said polarization state control circuit comprises:
an exclusive-OR circuit having a first input terminal to which said transmission data is input; and
a 1-bit delay circuit for delaying an output from said exclusive-OR circuit by one bit to supply it to a second input terminal of said exclusive-OR circuit.

23. The optical transmitter according to claim 17, wherein:
said optical transmitter further comprises:
at least one optical amplifier inserted in at least one of in front of said phase modulator, a position between said phase modulator and said intensity modulator, and a position between said intensity modulator and said polarization modulator.

24. The optical transmitter according to claim 17, wherein:
said optical transmitter further comprises:
a light source for supplying said input light to said optical modulator.

25. The optical transmitter according to claim 17, wherein: said intensity modulator comprises:
a first optical-intensity modulator for modulating the intensity of said phase-modulated light according to said
transmission data; and
a second optical-intensity modulator for modulating the intensity of an output, from said first optical-intensity modulator according to a bit rate frequency sine wave that is a sine wave of a frequency corresponding to the bit rate of said transmission data.

26. The optical transmitter according to claim 1, wherein:
said optical transmitter further comprises at least one optical amplifier inserted in at least one of a position in front of said optical modulator and a position between said optical modulator and said polarization modulator.

27. The optical transmitter according to claim 1, wherein:
said optical transmitter further comprises:
a light source for supplying said input light to said optical modulator.

28. The optical transmission system comprising:
the optical transmitter, according to claim 27;
an optical transmission line to which output light from said optical transmitter is input; and
an optical receiver to which output light from said optical transmission line is input.

29. The optical transmitter according to claim 1, wherein:
said optical modulator comprises:
a first optical-intensity modulator for modulating the intensity of said input light according to said transmission data; and
a second optical-intensity modulator for modulating the intensity of an output from said first optical-intensity modulator according to a bit rate frequency sine wave that is a sine wave of a frequency -corresponding to the bit rate of said transmission data.

* * * * *